(12) United States Patent
Hong et al.

(10) Patent No.: US 12,019,538 B2
(45) Date of Patent: Jun. 25, 2024

(54) SOFTWARE APPLICATION BUILD TESTING

(71) Applicant: SAP SE, Walldorf (DE)

(72) Inventors: Jingun Hong, Seoul (KR); Dong Won Hwang, Seoul (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/237,132

(22) Filed: Aug. 23, 2023

(65) Prior Publication Data
US 2023/0393968 A1 Dec. 7, 2023

Related U.S. Application Data

(63) Continuation of application No. 17/545,596, filed on Dec. 8, 2021, now Pat. No. 11,768,761.

(51) Int. Cl.
*G06F 11/36* (2006.01)
*G06F 8/71* (2018.01)

(52) U.S. Cl.
CPC .......... *G06F 11/3688* (2013.01); *G06F 8/71* (2013.01); *G06F 11/3684* (2013.01)

(58) Field of Classification Search
CPC ..................................................... G06F 11/36
See application file for complete search history.

(56) References Cited

U.S. PATENT DOCUMENTS

| | | | |
|---|---|---|---|
| 11,768,761 B2 | 9/2023 | Hong et al. | |
| 2013/0047141 A1* | 2/2013 | Shann | G06F 8/30 717/127 |
| 2015/0073967 A1* | 3/2015 | Katsuyama | G06Q 40/04 705/37 |
| 2018/0067740 A1* | 3/2018 | Bofferding | G06F 8/36 |
| 2020/0019494 A1* | 1/2020 | Kwon | G06F 11/3608 |
| 2020/0242010 A1* | 7/2020 | Hicks | G06F 11/3676 |
| 2020/0349055 A1* | 11/2020 | Reddy | G06F 11/3692 |
| 2023/0176961 A1 | 6/2023 | Hong et al. | |

OTHER PUBLICATIONS

Abreu, Rui, et al., "On the Accuracy of Spectrum-based Fault Localization", IEEE, (2007), 10 pgs.

Amar, Anunay, et al., "Mining Historical Test Logs to Predict Bugs and Localize Faults in the Test Logs", IEEE/ACM 41st International Conference on Software Engineering (ICSE), (2019), 140-151.

(Continued)

*Primary Examiner* — Jae U Jeon
(74) *Attorney, Agent, or Firm* — SCHWEGMAN LUNDBERG & WOESSNER, P.A.

(57) ABSTRACT

Various examples are directed to systems and methods for testing software. A testing system may use test case data describing a first test case failed by a first build of the software application, the first build generated by a first commit operation of the plurality of commit operations to execute a fault localization operation, the fault localization operation to identify a first suspect program element of a first build. The testing system may use the first suspect program element and commit data to select a second commit operation from the plurality of commit operations. The testing system may determine an error-inducing commit operation from the plurality of commit operations and executing a corrective action.

20 Claims, 8 Drawing Sheets

(56) References Cited

OTHER PUBLICATIONS

Bagherzadeh, Mojtaba, et al., "Reinforcement Learning for Test Case Prioritization", arXiv:2011.01834v2, (2022), 1-21.

Gonzalez-Sanchez, Alberto, et al., "Prioritizing tests for software fault localization", 10th International Conference on Quality Software, (2010), 10 pgs.

Jiang, He, et al., "What Causes My Test Alarm? Automatic Cause Analysis for Test Alarms in System and Integration Testing", IEEE/ACM 39th International Conference on Software Engineering, (2017), 712-723.

Ribeiro, Henrique, et al., "Evaluating data-flow coverage in spectrum-based fault localization", arXiv:1906.11715v1, (2019), 11 pgs.

Yaraghi, Ahmadreza, et al., "Scalable and Accurate Test Case Prioritization in Continuous Integration Contexts", IEEE Transactions on Software Engineering, vol. 49, No. 4, (2023), 1615-1639.

U.S. Appl. No. 17/545,596 U.S. Pat. No. 11,768,761, filed Dec. 8, 2021, Software Application Build Testing.

"U.S. Appl. No. 17/545,596, Notice of Allowance mailed May 19, 2023", 13 pgs.

* cited by examiner

SOFTWARE APPLICATION BUILD TESTING

CROSS-REFERENCE TO RELATED APPLICATIONS

This application is a continuation of prior application Ser. No. 17/545,596, filed on Dec. 8, 2021, which is incorporated by reference herein in its entirety.

BACKGROUND

Traditionally modes of software development involved developing a software application and then performing error detection and debugging on the application before it is released to customers and/or other users. Error detection and debugging were time-consuming, largely manual activities. Because releases were typically separated in time by several months or even years, however, smart project planning could leave sufficient time and resources for adequate error detection and debugging.

BRIEF DESCRIPTION OF DRAWINGS

The present disclosure is illustrated by way of example and not limitation in the following figures.

DETAILED DESCRIPTION

Figure 1:
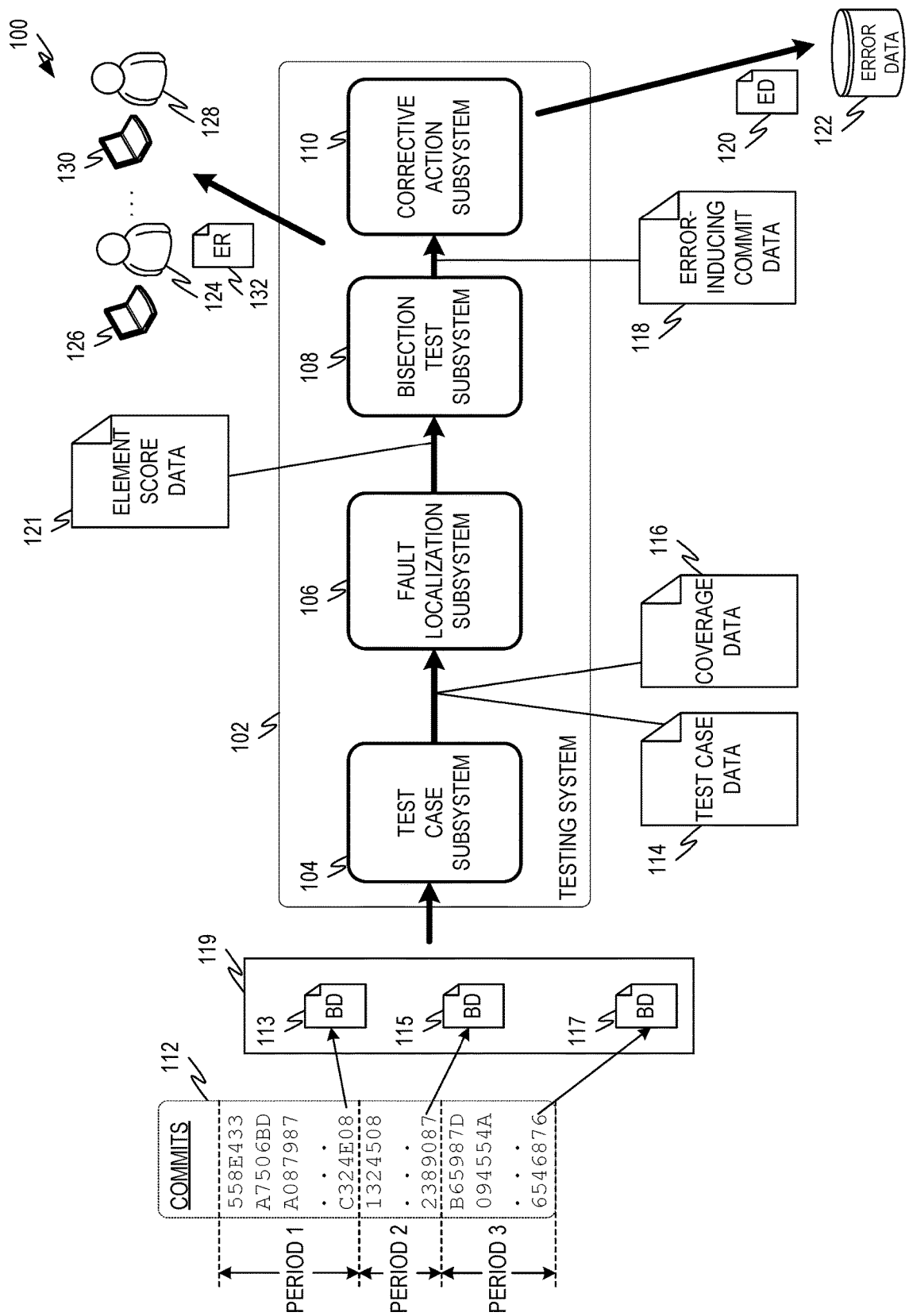
FIG. 1 is a diagram showing one example of an environment for software testing.

Various examples described herein are directed to software testing and error detection that may be performed in an automated manner.

In many software delivery environments, modifications to a software application are coded, tested, and sometimes released to users on a fast-paced timescale, sometimes quarterly, bi-weekly, or even daily. Also, large-scale software applications may be serviced by a large number of software developers, with many developers and developer teams making modifications to the software application.

In some example arrangements, a continuous integration/continuous delivery (CI/CD) pipeline arrangement is used to support a software application. According to CI/CD pipeline, a developer entity maintains an integrated source of an application, called a mainline or mainline build. The mainline build is the most recent build of the software application. At release time, the mainline build is released to and may be installed at various production environments such as, for example, at public cloud environments, private cloud environments, and/or on-premise computing systems where users can access and utilize the software application.

Between releases, a development team or teams may work to update and maintain the software application. When it is desirable for a developer to make a change to the application, the developer checks out a version of the mainline build from a source code management (SCM) system into a local developer repository. The developer builds and tests modifications to the mainline. When the modifications are completed and tested, the developer initiates a commit operation. In the commit operation, the CI/CD pipeline executes an additional series of integration and acceptance tests to generate a new mainline build that includes the developer's modifications.

As software applications become larger and more complicated, the number and frequency of commit operations increases. The amount of time and computing resources used to execute test cases may also increase. As a result, it may become impractical to execute more complex test cases for each build of the mainline. One way to address this challenge is to execute more complex test cases on less than all of the mainline builds. For example, certain test cases may be executed periodically (e.g., every 12 hours, every 24 hours, every business day, every 48 hours, every week, etc.). In other examples, some test cases are executed after a predetermined number of commits (e.g., every 10 commit operations, every 50 commit operations, etc.). When test cases are executed on less than all of the builds of a software application, however, additional challenges may be created. For example, if a test case fails due to a bug or error in a current mainline build, determining which commit operation induced the error may be non-trivial.

In some examples, the error-inducing commit operation can be detected using bisection. According to bisection, a testing system selects a middle commit operation that is roughly half-way between the commit operation that generated the last build to pass the test case and the commit operation that generated the build that failed the test case. For example, if there have been fifty commit operations since the last build that passed the test case, the testing system may select the twenty-fifth commit operation as the middle commit operation. The testing system may access the build generated by the middle commit operation and execute the test case on that build. If the build passes the test case, it may indicate that the error-inducing commit operation was executed after the middle commit operation. If the build fails the test case, it may indicate that the error-inducing commit operation was executed before the middle commit operation.

Next, the testing system selects a next middle commit based on whether the first middle commit passed or failed the test case. For example, if the first middle commit passed the test case, the new middle commit may be roughly halfway between the previous middle commit and the build that failed the test case. If the first middle commit failed the test case, the new middle commit may be roughly halfway between the commit operation that generated the last build to pass the test case and the previous middle commit. This process may continue iteratively, for example, until the testing system identifies consecutive commit operations that pass and then fail the test case. The first commit operation generating a build that fails the test case may be the error-inducing commit operation. When the error-inducing commit operation is identified, the testing system may execute a corrective action as described herein.

In some examples, using bisection to identify an error-inducing commit operation may still be time and resource consuming. For example, executing the test case at builds generated by the various middle commits may take time and computing resources. The more iterations that are executed to identify the error-inducing commit operation, the more time and computing resources are used.

Various examples described herein may tend to reduce the number of iterations executed to identify an error-inducing commit operation by utilizing a fault localization operation. A fault localization operation may utilize the results of one or more test cases along with coverage data to identify one or more suspect program elements in a subject build. Coverage data describes the program elements of a build, such as code lines, functions, services, and/or the like, that are executed during different test cases. Suspect program elements are program elements that are more likely to include errors than other program elements of the build.

The testing system utilizes the suspect program element or elements to select a starting commit operation to use in a modified bisection technique. For example, instead of selecting a middle commit, the testing system may identify a starting commit operation that is or is near a commit operation that modified the suspect program element. As a result, the starting commit operation is more likely to be or to be near the error-inducing commit operation than a middle commit operation. Starting bisection at the starting commit selected using one or more suspect program elements as described herein may make the modified bisection technique more likely to identify the error-inducing commit in fewer iterations, thus reducing the time and computing resources for identifying the error-inducing commit.

When the error-inducing commit is identified, the testing system may take a corrective action. For example, the testing system may send a report message to a developer user, where the report message comprises an indication of the error-inducing commit operation. The developer may respond to the report message by correcting the identified error. In another example, the corrective action may include reverting to a good build of the software application, where the good build was generated by a commit operation before the error-inducing commit.

FIG. 1 is a diagram showing one example of an environment 100 for software testing. The environment 100 comprises a testing system 102 and a code repository 119, which may be all or part of an SCM system. The testing system 102 may include one or more computing devices that may be located at a single geographic location and/or distributed across different geographic locations.

The testing system 102 is configured to apply one or more test cases to builds 113, 115, 117 of a software application, shown in FIG. 1 stored at the code repository 119. The builds 113, 115, 117 of the software application are generated by applying a series of sequential commits operations. FIG. 1 shows a list 112 including identifiers for a set of example commit operations. In the example of FIG. 1, the commit operations are identified by seven-digit hexadecimal numbers, although any suitable identifiers may be used.

The commit operations illustrated in the list 112 may be sequentially executed. For example, the commit operation 558E433 may be executed first. The commit operation A7506BD may be executed next. The commit operation A087987 may be executed next, and so on. The commit operations of the list 112 may be executed, for example, using a CI/CD pipeline, such as the example CI/CD pipeline illustrated herein and described with reference to FIG. 5. It will be appreciated, however, that the commit operations may be executed in any suitable arrangement that applies sequential commit operations to a software application build.

The example list 112 also indicates commit operations executed in different periods. For example, commit operations 558E433 through C324E08 may have been executed sequentially in a first period (PERIOD 1). Commit operations 1324508 through 2389087 may have been executed in a second period (PERIOD 2). Commit operations B65987D through 6546876 may have been executed in a third period (PERIOD 3) and so on. In some examples, the periods PERIOD 1, PERIOD 2, PERIOD, 3 are time periods such as, for example, 8 hours, 24 hours, 48 hours, one week, and the like. In some examples, the periods PERIOD 1, PERIOD 2, PERIOD 3 may not have the same length. Also, in some examples, each period PERIOD 1, PERIOD 2, PERIOD 3 includes the same number of commit operations and in other examples, one or more of the periods PERIOD 1, PERIOD 2, PERIOD 3 include different numbers of commit operations. Although three periods are shown in FIG. 1, it will also be appreciated that any suitable number of periods and commit operations may be used. In some examples, the testing system 102 continuously tests commit operations and corresponding builds generated over a number of time periods.

Although only the builds 113, 115, 117 are shown in FIG. 1, it will be appreciated that each of the sequentially executed commit operations shown in the example list 112, when executed, may generate a corresponding build of the software application. The builds 113, 115, 117, as shown, are generated from the last commit operations of the respective periods PERIOD 1, PERIOD 2, PERIOD 3. In the example of FIG. 1, the build 113 was generated by commit operation 558E433, which is the last commit operation of PERIOD 1. The build 115 was generated by the commit operation 2389087, which is the last commit operation of PERIOD 2. The build 117 was generated by commit operation 6546876, which is the last commit operation of PERIOD 3.

The testing system 102 is configured to test the builds 113, 115, 117 and/or additional builds generated by other commit operations, as described herein. The testing system 102 comprises a test case subsystem 104, a fault localization subsystem 106, a bisection test subsystem 108 and a corrective action subsystem 110. The various subsystems 104, 106, 108 may be implemented using various hardware and/or software subcomponents of the testing system 102. In some examples, one or more of the subsystems 104, 106, 108, 110 is implemented on a discrete computing device or set of computing devices. In some examples, one or more of the subsystems 104, 106, 108, 110 are implemented using software components.

The test case subsystem 104 of the testing system 102 applies one or more test cases to a build. A test case may comprise input data describing a set of input parameters provided to the build and result data describing how a build is expected to behave when provided with the set of input parameters. The test case subsystem 104 may apply a test case to a build by executing the build, applying the test parameters to the build, and observing the response of the build. A build may pass the test case if it responds to the input data in the way described by the result data. If a build fails to respond to the input data in the way described by the result data, the build may fail the test case.

Consider an example in which a build is or includes a database management application. Test data may comprise a set of one or more queries to be executed by the database management application and result data describing how the database management application should behave in response to the queries. The build may pass the test if it generates the expected result data in response to the provided queries.

The test case subsystem 104 may be configured to apply one or more test cases to some, but not all of the builds of the software application. For example, the test case subsystem 104 may be configured to apply one or more test cases to the builds 113, 115, 117 that are generated by the last commit operations of the respective periods PERIOD 1, PERIOD 2, PERIOD 3. The test case subsystem 104 may evaluate the build 113 after PERIOD 1. The test case subsystem 104 may evaluate the build 115 after PERIOD 2 and may evaluate the build 117 after PERIOD 3 and so on.

Upon applying one or more test cases to a build 113, 115, 117, the test case subsystem 104 may generate test case data 114. The test case data 114 describes whether the build 113, 115, 117 passed or failed the one or more test cases applied by the test case subsystem 104. In some examples, the test case data 114 also describes the behavior and/or output of the build 113, 115, 117 in response to the input parameters of the one or more test cases.

Based on the test case data 114, the testing system 102 may determine whether to identify an error-inducing commit operation for a build. The testing system 102 may determine to identify an error-inducing commit operation for a build 113, 115, 117, for example, if the build 113, 115, 117 fails one or more test cases. In some examples, the testing system 102 may determine to identify an error inducting commit operation for a build 113, 115, 117 if the build 113, 115, 117 has newly failed one or more test cases. A test case may be newly failed if the build 113, 115, 117 fails the test case and the most recent previously tested build passed the test case.

Consider an example in which the test case subsystem 104 evaluates the build 117 and the build 117 fails a first test case. If the most recent previously-tested build (build 115 in the example of FIG. 1) also failed the first test case, it may indicate that the error-inducing commit operation causing the build 117 to fail the test case did not occur during PERIOD 3. Accordingly, the testing system 102 may not attempt to identify the error-inducing commit operation using build 117. On the other hand, if the most recent previously-tested build 115 passed the first test case, but the build 117 fails the test case, it may indicate that the error-inducing commit operation did occur in PERIOD 3. Accordingly, the testing system 102 may determine to identify an error-inducing commit operation for the build 117.

In some examples, the testing system 102 is configured to identify an error-inducing commit operation for a subject build 113, 115, 117 using the fault localization subsystem 106 and the bisection test subsystem 108. The fault localization subsystem 106 receives (all or part of) the test case data 114 and coverage data 116. The test case data 114, as described herein, may indicate which test case or test cases were failed by a subject build 113, 115, 117. Coverage data 116 may indicate which program elements of the subject build 113, 115, 117 are executed in different test cases.

The fault localization subsystem 106 utilizes the test case data 114 and coverage data 116 to generate program element score data 121. Program element score data 121 describes scores for one or more program elements of the subject build 113, 115, 117. Any suitable fault localization arrangement may be used to generate the program element scores. In some examples, the fault localization subsystem 106 uses a spectrum-based fault localization technique. According to a spectrum-based fault localization technique, the more frequently that a program element is covered in failed test cases and the less frequently the program element is covered in passed test cases, the more suspicious the program element is. As described herein, the program elements may be or include any suitable delineation of the subject build 113, 115, 117 such as, for example, lines of code, functions, services, and/or the like.

The fault localization subsystem 106 may utilize the test case data 114 describing a plurality of test cases and coverage data 116 to identify which program elements of the subject build 113, 115, 117 are covered by the test cases. An example representation is provided by TABLE 1 below:

TABLE 1

|    | $e_1$ | $e_2$ | $e_3$ | $e_4$ |     | $e_n$ | Result |
|----|-------|-------|-------|-------|-----|-------|--------|
| t1 | 0     | 0     | 0     | 1     | ... | 0     | PASS   |
| t2 | 1     | 0     | 1     | 0     | ... | 1     | FAIL   |
| t3 | 0     | 1     | 1     | 0     | ... | 0     | FAIL   |

In the example of TABLE 1, the subject build 113, 115, 117 includes n program elements ($e_1$-$e_n$) and three test cases (t1, t2, t3) were executed by the test case subsystem 104. In this example, the subject build 113, 115, 117 passed the test case t1 and failed the test cases t2 and t3. The coverage data is indicated by "0's" and "1's". In this example, a "0" indicates that a program element was not covered by a test case. A "1" indicates that the program element was covered by the test case.

The fault localization subsystem 106 may utilize a combination of test case results and coverage, such as the example combination of TABLE 1, to generate a program element score for some or all of the program elements. Various different coefficients may be used to generate the program element scores including, for example, an Ochiai coefficient, a Jaccard coefficient, a Tarantula coefficient, and the like. An example for finding a program element score using an Ochiai coefficient is given by Equation [1] below:

$$PES = \frac{e_f}{\sqrt{(e_f + n_f) \times (e_f + e_p)}} \qquad [1]$$

In Equation [1], PES is the program element score and may be determined for each program element in a subject build 113, 115, 117. The quantity e f is the number times that the program element was covered by a test case that failed. The quantity $n_f$ is the number of times that the program element was not covered by a test case that failed. The quantity $e_p$ is the number of times that the program element was covered by a test case that passed. The quantity $n_p$ is the number of times that the program element was not covered by a test case that passed. In the example of Equation [1] a higher program element score indicates that a program element is more likely to include an error, although some fault localization scoring arrangements may be arranged such that a lower program element score indicates that the program element is more likely to include an error. In some examples, the element score data 121 includes scores for one or more suspect program elements. A suspect program element may have a program element score indicating an elevated likelihood that the program element induces an error as compared to other program elements of the subject build.

The bisection test subsystem 108 may utilize element score data 121 generated by the fault localization subsystem 106 to select a starting commit operation for a modified bisection test. This may be done in any suitable way. For example, the bisection test subsystem 108 may generate a correlation between program elements having high program element scores (e.g., scores suggesting that the program elements are likely to include an error) and corresponding commit operations. Any suitable correlation may be used. In some examples, the bisection test subsystem 108 generates an error likelihood score for each commit operation associated with the subject build 113, 115, 117. In an example where the subject build is build 117, the bisection test subsystem 108 may generate an error likelihood score for the commit operations executed during PERIOD 3. The error likelihood score for a commit operation may be based on the program elements score or scores of the program elements that were modified by the commit operation.

Based on the error likelihood score or scores, the bisection test subsystem 108 selects the starting commit operation. The starting commit operation, in some examples, is the commit operation showing the highest likelihood of including an error (e.g., the commit operation with the highest error likelihood score). In some examples, the bisection test subsystem 108 selects a starting commit operation that was executed prior to the commit operation showing the highest likelihood of including an error. Beginning at the starting commit operation, the bisection test subsystem 108 may execute a modified bisection test, as described herein, to identify one or more error-inducing commit operations. The one or more error-inducing commit operations may be described by error-inducing commit data 118, which may be provided to the corrective action subsystem 110.

The corrective action subsystem 110 may execute one or more corrective actions based on the one or more error-inducing commit operations described by the error-inducing commit data 118. In some examples, the correction action subsystem 110 sends a report message 132 to one or more developer users 124, 128. The report message 132 may comprise an indication of the error-inducing commit operation or operations and a request that the developer user 124, 128 correct the error-inducing commit operation. In some examples, the corrective action subsystem 108 routes a report message 132 to the developer user 124, 128 that submitted the error-inducing commit operation or to a different developer user 124, 128. If more than one error-inducing commit operation is identified, the corrective action subsystem 110 may direct a report message 132 to more than one developer user 124, 128.

The developer users 124, 128 may receive the report message 132 using one or more user computing devices 126, 130. User computing devices 126, 130 may be or include any suitable computing device such as, for example, desktop computers, laptop computers, tablet computers, mobile computing devices, and the like.

In some examples, the corrective action subsystem 110 stores error data 120 at an error data store 122. The error data 120 describes the one or more error-inducing commit operations. In some examples, the error data 120 also describes one or more report messages 132 provided to one or more developer users 124, 128 for correcting the error-inducing commit operations.

Another example corrective action that may be taken by the corrective action subsystem 110 includes reverting the software application to a good build. A good build may be a build that was generated by a commit operation prior to the error-inducing commit. In some examples, the good build is the build generated by the commit operation immediately before the error-inducing commit.

Figure 2:
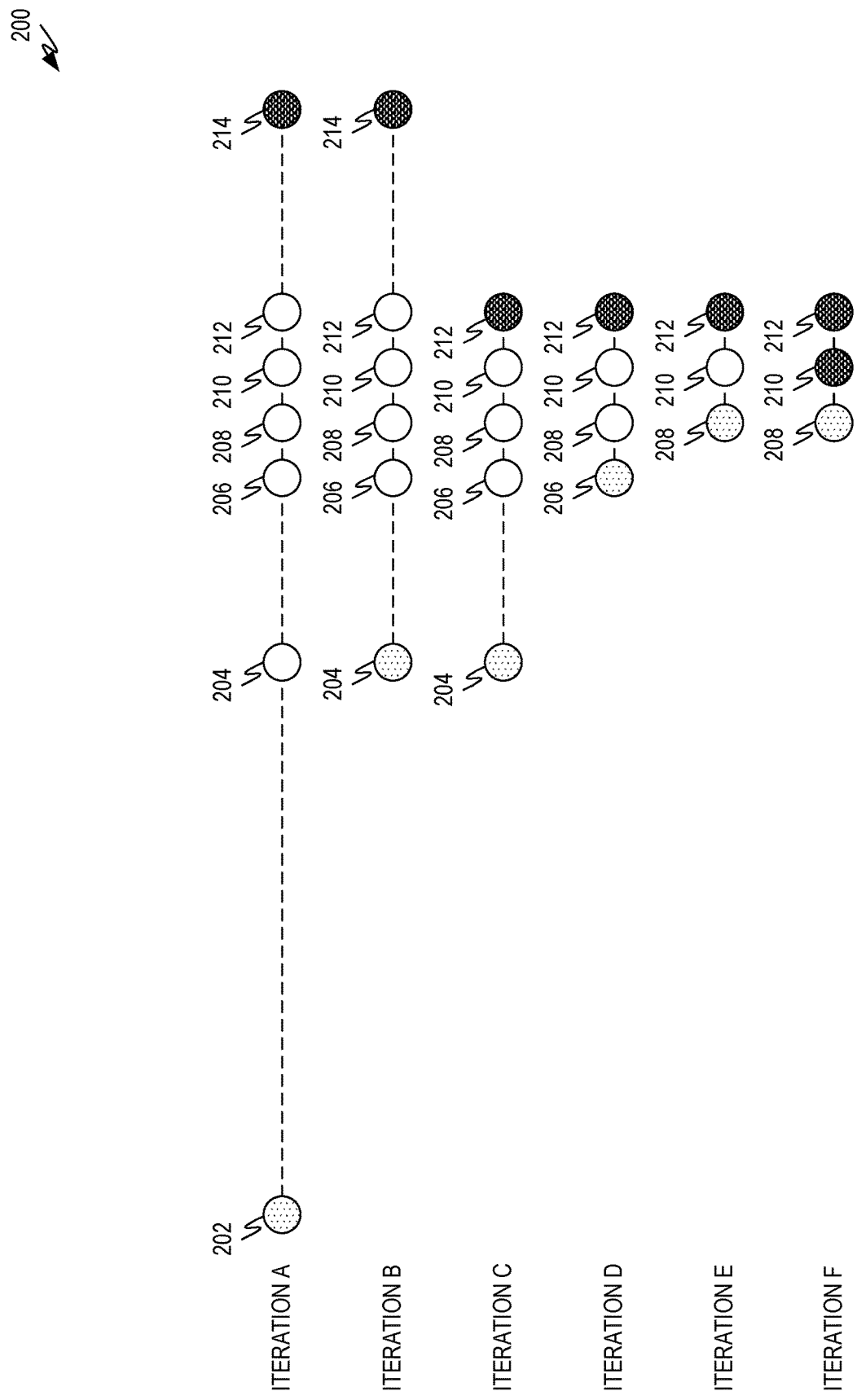
FIG. 2 is a diagram illustrating one example application of a bisection technique.

FIG. 2 is a diagram 200 illustrating one example application of a bisection technique. The example bisection technique illustrated in FIG. 2 is implemented on a subject build that includes a number of commit operations 202, 204, 206, 208, 210, 212, 214. It will be appreciated that not all of the commit operations between the commit operation 202 and the commit operation 214 are shown in FIG. 2. The example of FIG. 2 also shows a series of iterations labeled A through F.

The commit operations 202, 204, 206, 208, 210, 212, 214 may include commit operations executed on the software application in a current period or since the last time that test cases were applied to the software application. For example, a commit operation (not shown) immediately prior to the commit operation 202 may have been the last commit operation of a prior period. The commit operation 214 may be the last commit operation of a current period. Accordingly, the one or more test cases may have been applied to the build generated by the commit operation 214. In this example, the build generated by the commit operation 214 failed one or more of the applied test cases and may have newly failed one or more of the applied test cases, as described herein.

To apply bisection, a middle commit operation 204 is selected. As illustrated in FIG. 2, the middle commit operation 204 is about halfway between a starting commit operation 202 and the last commit operation 214 of the period, meaning that (roughly) the same number commit operations in the period were executed before the middle commit operation 204 as after the middle commit operation 204.

In iteration A, the build generated by the commit operation 204 is accessed. For example, the build generated by the commit operation 204 may be stored at a code repository such as the code repository 119. In other examples, the build generated by commit operation 204 may be re-generated by starting from a prior build and sequentially applying one or more commit operations prior to the commit operation 204 and/or the commit operation 204 itself. The one or more test cases are applied to the build generated by the commit operation 204.

In the example shown by FIG. 2, the build generated by the commit operation 204 passes the one or more test operations. Accordingly, for iteration B, a next commit operation is executed. Because the previous middle commit operation 204 passed the one or more test operations, the next commit operation may be roughly in the middle between the previous middle commit operation (here, commit operation 204) and the last commit operation of the tested period. In this example, the commit operation 212 is the next commit operation. The build generated by the commit operation 212 is accessed and the test cases are applied. In this example, the build generated by the commit operation 212 fails one or more of the test cases.

In iteration C, a next commit operation is again selected. Here, because the previous commit operation 212 failed the one or more test cases, the next commit operation is selected between the initial middle commit operation 204 and the last failed commit operation 212. In this case, commit operation 206 is selected. The build associated with commit operation 206 is accessed and the one or more test cases are applied. In this example, the build generated by the commit operation 206 passes the one or more test cases. Accordingly, the next commit operation for iteration D is selected between the commit operation 206 and the failed commit operation 212. For example, commit operation 208 may be selected.

In the example of FIG. 2, the build generated by the commit operation 208 passes the one or more test cases, so a next commit operation 210 for an iteration E is selected between previous commit operation 208 and the last failed commit operation 212. In iteration F, the build generated by the commit operation 210 fails the one or more test cases. Accordingly, the testing system has identified consecutive commit operations 208, 210 where the first commit operation 208 generates a build that passes the one or more test cases and the next commit operation 210 generates a build that fails. Accordingly, commit operation 210 may be an error-inducing commit.

FIG. 2 also illustrates various ways that the example testing system disclosed herein may streamline the process of identifying error-inducing commits. For example, the bisection test subsystem 108, instead of beginning with the middle commit operation 204, may select a starting commit operation using the element score data 121, as described herein. This may make the bisection test subsystem 108 more likely to complete the modified bisection technique in fewer iterations. For example, referring to the example of FIG. 2, if the commit operation 210 introduced and/or modified one or more suspect program elements having high element scores, the commit operation 210 and/or a nearby commit operation, such as commit operation 208 or 206, may be selected as the starting commit operation. Accordingly, the total number of iterations may be reduced.

Figure 3:
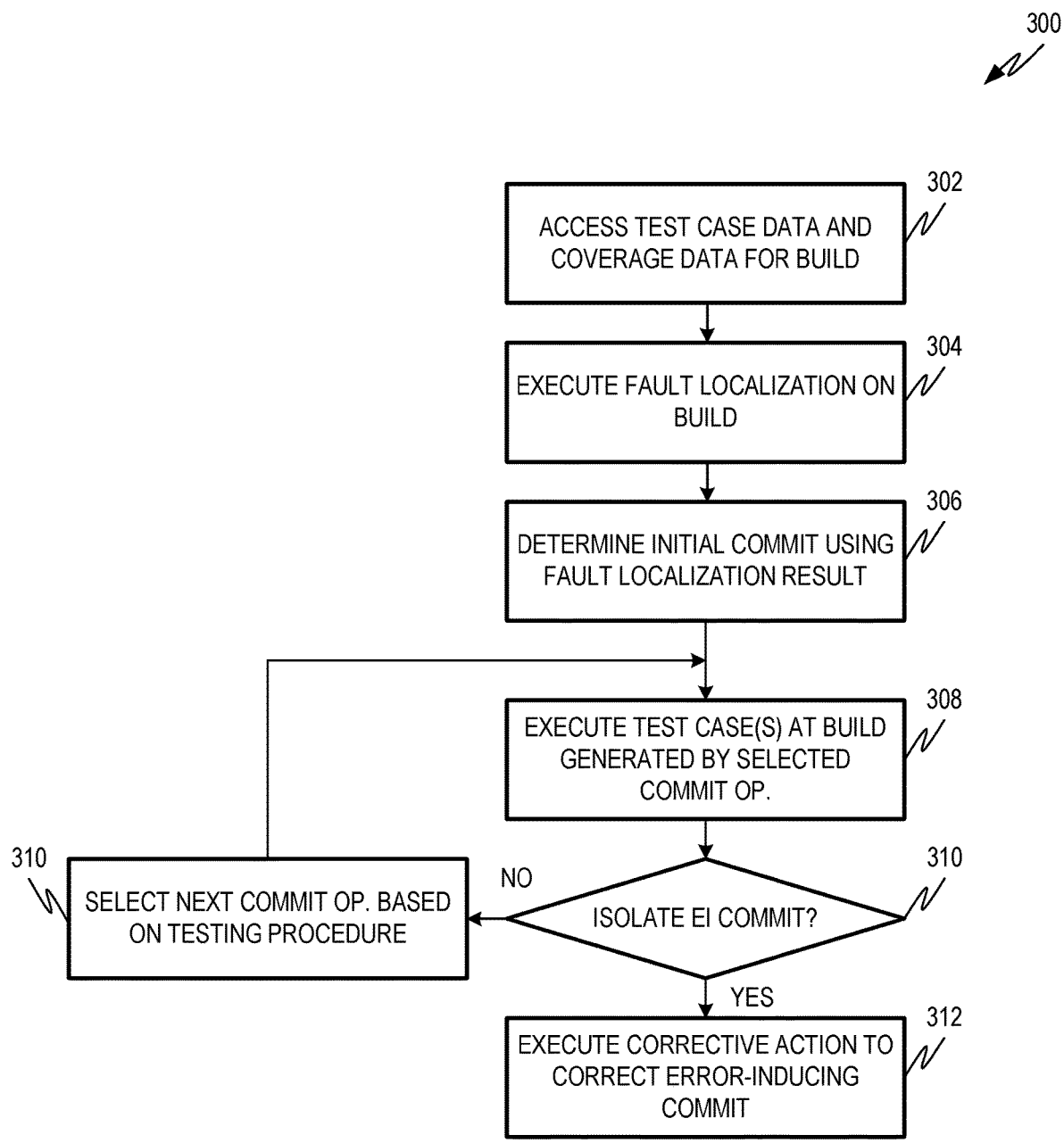
FIG. 3 is a flowchart showing one example of a process flow that may be executed by the testing system of FIG. 1 to test a software application.

FIG. 3 is a flowchart showing one example of a process flow 300 that may be executed by the testing system 102 to test a software application. At operation 302, the testing system 102 (e.g., the fault localization subsystem 106 thereof) accesses test case data and coverage data for a build. The test case data, such as test case data 114, may describe the result of applying one or more test cases to the build. Coverage data, such as coverage data 116, may describe program elements of the build that are covered by the one or more test cases. At operation 304, the testing system 102 (e.g., the fault localization subsystem 106 thereof) may execute fault localization on the build, for example, as described herein, to identify one or more suspect program elements. For example, the fault localization subsystem 106 may generate element score data 121 including element scores for one or more program elements, as described herein.

At operation 306, the testing system 102 (e.g., the bisection test subsystem 108) may select a starting commit operation using the results of the fault localization (e.g., the element score data 121). At operation 308, the testing system 102 (e.g., the bisection test subsystem 108) executes one or more test cases at the build generated by the starting commit operation. At operation 310, the testing system 102 (e.g., the bisection test subsystem 108) determines whether the result of the test cases has isolated an error-inducing commit. For example, as described herein, if consecutive passing and then failing commit operations are identified, the first failing commit operation may be an error-inducing commit operation. If an error-inducing commit is isolated at operation 310, the testing system (e.g., the corrective action subsystem 110 thereof) may execute a corrective action at operation 312, for example, as described herein.

If an error-inducing commit has not yet been isolated at operation 310, the testing system 102 (e.g., the bisection test subsystem 108), at operation 310, selects a next commit operation at operation 310. The next commit operation may be selected based on the results of the test cases at operation 308 and/or on the element scores generated by the fault localization. After a next commit is selected, the testing system may again execute test cases on the build generated by the next commit at operation 308.

Figure 4:
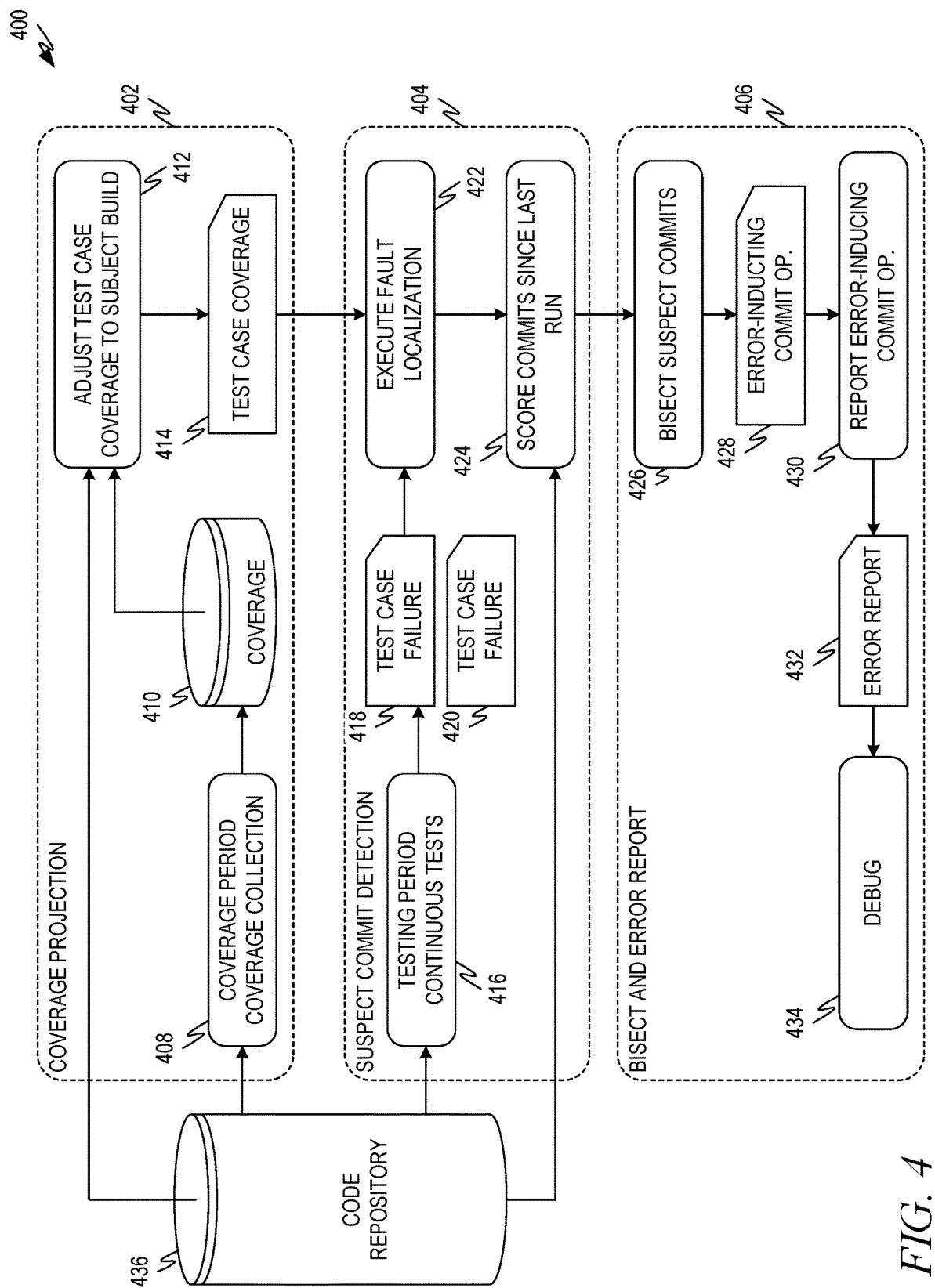
FIG. 4 is a diagram showing one example of a workflow that may be executed by a testing system, such as the testing system of FIG. 1, to test a software application.

FIG. 4 is a diagram showing one example of a workflow 400 that may be executed by a testing system, such as the testing system 102 of FIG. 1, to test a software application. The workflow 400 comprises a coverage projection operation 402, a suspect commit detection operation 404, and a bisect and error report operation 406.

The coverage projection operation 402 may generate coverage data that relates program elements to one or more test cases that cover the program elements. For example, the coverage projection operation 402 may generate coverage data 116 that is used by the fault localization subsystem 106 as described herein. The coverage projection operation 402 may include a coverage period coverage collection suboperation 408. At the coverage period coverage collection suboperation 408, builds generated by commit operations executed during a coverage period are accessed from a code repository 436. The builds comprise a plurality of code elements. The coverage collection at suboperation 408 may also include generating coverage data 410. For example, the testing system 102 (or other suitable system) may apply one or more test cases to the build or builds accessed from the code repository 436 and track the program elements that are executed or covered during the respective test cases. This may result in the coverage data 410.

The coverage projection operation 402 may also include an adjust test case coverage to subject commit operation 412. For example, the coverage period for a software application may not be the same as the testing period for the application. Referring back to FIG. 1, the periods PERIOD 1, PERIOD 2, PERIOD 3 may be testing periods and indicate the time, number of commit operations or other signifier of the commit operations between application of the test cases. If the coverage period is not the same as the testing period, the adjust test case coverage to subject commit operation 412 may modify the coverage data to apply to a subject build. Accordingly, test case coverage data 414 may be particular to a given build.

The suspect commit detection operation 404 may be performed, for example, by the fault localization subsystem 106. A testing period continuous test operation 416 access a subject build from the code repository 436 and executes one or mote test cases for the subject build. Test case failure data 418, 420 may be generated if the subject build fails one or more tests. An execute fault localization suboperation 422 may comprise utilizing the test case failure data 418, 420 and test case coverage data 414 to implement fault localization in the subject build, for example, as described herein. The result of the fault localization may include element scores for one or more of the program elements of the subject build.

A suboperation for scoring commits since last run 424 may select a starting commit for applying a modified bisection technique based on the program element scores, as described herein. In some examples, the suboperation 424 is performed by the fault localization subsystem 106 and/or another component of the testing system 102.

Referring now to the bisect and error report operation, a bisect suspect commits suboperation 426 may include performing bisection technique iteration until an error-inducing commit operation 428 is isolated, for example, as described herein. The suboperation 426 may be executed, for example, by the fault localization subsystem 106, the bisection test subsystem 108, and/or another component of the testing system 102. A report error-inducing commit operation 430 may include writing error data 120 to the error data store 122 and/or otherwise generates an error report 432. At a debug suboperation 434, the error-inducing commit operation is corrected, for example, by a developer user 124, 128.

Figure 5:
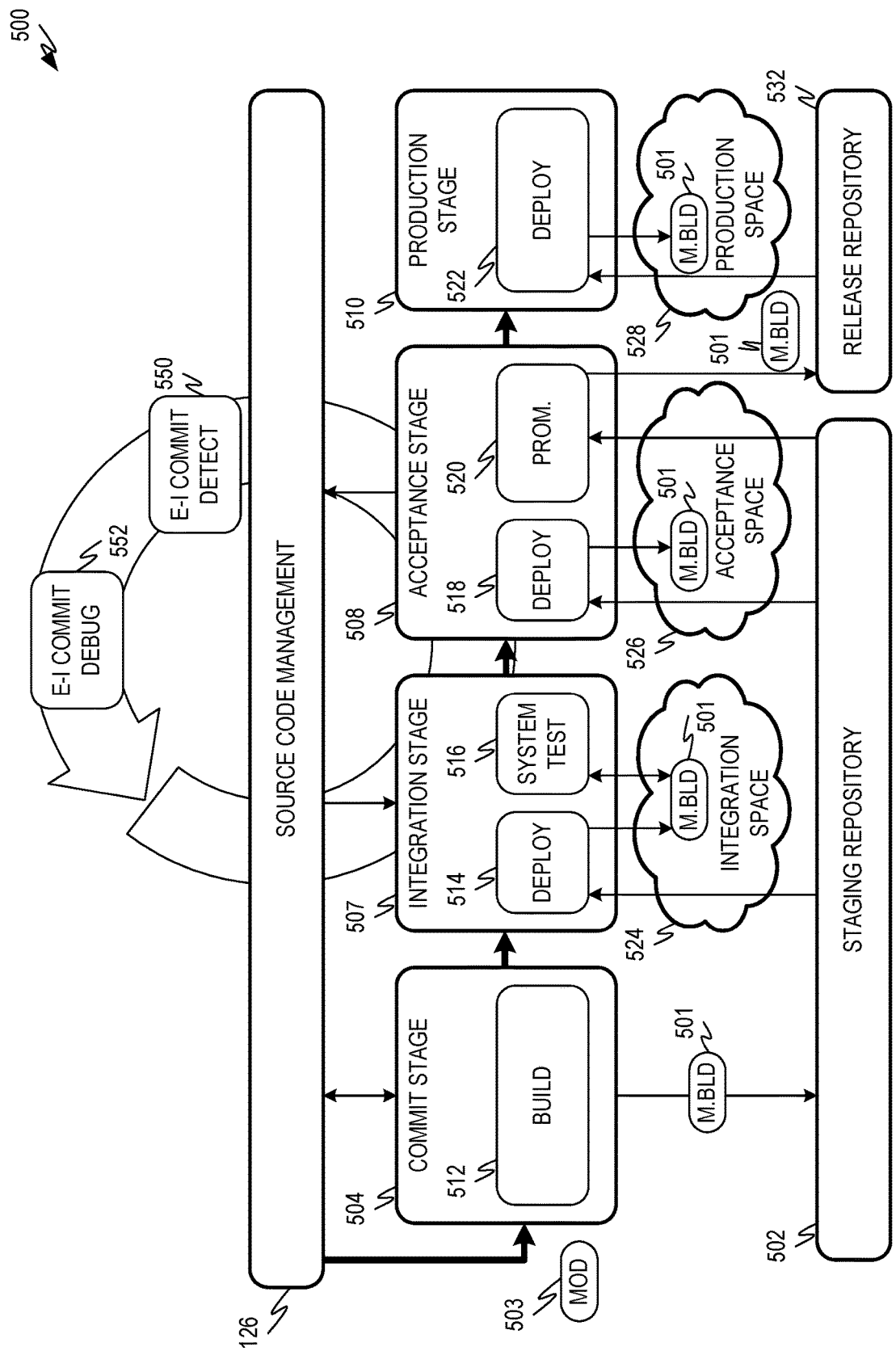
FIG. 5 is a diagram showing one example of a CI/CD pipeline incorporating various software testing described herein.

FIG. 5 is a diagram showing one example of a CI/CD pipeline 500 incorporating various software testing described herein. The CI/CD pipeline 500 is initiated when a developer user, such as one of developer users 124, 128, submits a build modification 503 to the commit stage 504, initiating a commit operation. The build modification 503 may include a modified version of the mainline build previously downloaded by the developer user 124, 128.

The commit stage 504 executes a commit operation 512 to create and/or refine the modified software application build 501. For example, the mainline may have changed since the time that the developer user 124, 128 downloaded the mainline version used to create the modification 503. The modified software application build 501 generated by commit operation 512 includes the changes implemented by the modification 503 as well as any intervening changes to the mainline. The commit operation 512 and/or commit stage 504 stores the modified software application build 501 to a staging repository 502 where it can be accessed by various other stages of the pipeline 500.

An integration stage 507 receives the modified software application build 501 for further testing. A deploy function 514 of the integration stage 507 deploys the modified software application build 501 to an integration space 524. The integration space 524 is a test environment to which the modified software application build 501 can be deployed for testing. While the modified software application build 501 is deployed at the integration space 524, a system test function 516 performs one or more integration tests on the modified software application build 501. If the modified software application build 501 fails one or more of the tests, it may be returned to the developer user 124, 128 for correction. If the modified software application build 501 passes testing, the integration stage 507 provides an indication indicating the passed testing to an acceptance stage 508.

The acceptance stage 508 uses a deploy function 518 to deploy the modified software application build 501 to an acceptance space 526. The acceptance space 526 is a test environment to which the modified software application build 501 can be deployed for testing. While the modified software application build 501 is deployed at the acceptance space 526, a promotion function 520 applies one or more promotion tests to determine whether the modified software application build 501 is suitable for deployment to a production environment. Example acceptance tests that may be applied by the promotion function 520 include Newman tests, UiVeri5 tests, Gauge BDD tests, various security tests, etc. If the modified software application build 501 fails the testing, it may be returned to the developer user 124, 128 for correction. If the modified software application build 501 passes the testing, the promotion function 520 may write the modified software application build 501 to a release repository 532, from which it may be deployed to production environments.

The example of FIG. 5 shows a single production stage 510. The production stage 510 includes a deploy function 522 that reads the modified software application build 501 from the release repository 532 and deploys the modified software application build 501 to a production space 528. The production space 528 may any suitable production space or environment as described herein.

In various examples, the various examples for software testing described herein may be implemented during the acceptance stage 508 and/or the integration stage 507. An error-inducing detection operation 550 may be executed by the testing system 102 utilizing fault localization, as described herein. An error-inducing commit debug or correction operation 552 may be executed by the testing system 102 (e.g., the corrective action subsystem 110) as described herein.

Figure 6:
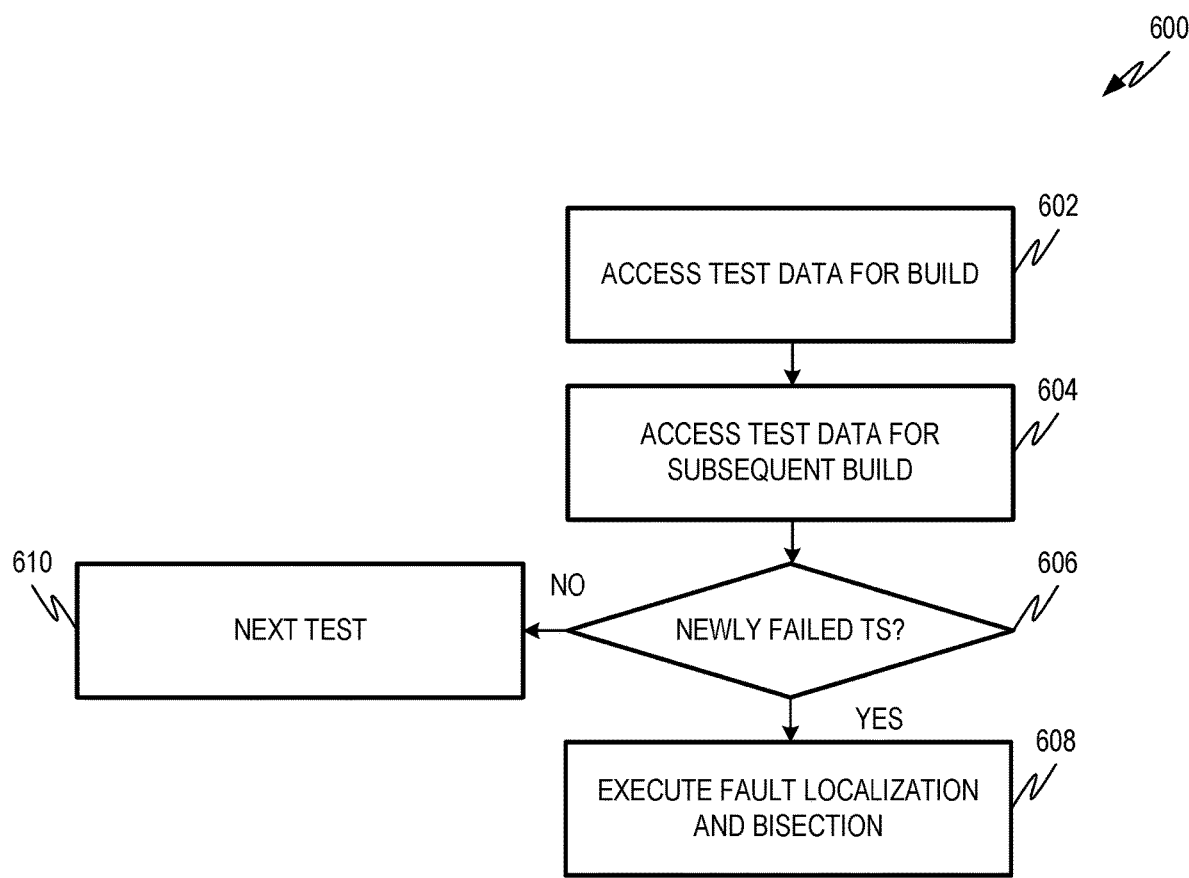
FIG. 6 is a flowchart showing one example of a process flow that may be executed by the testing system of FIG. 1 to identify builds for further testing.

FIG. 6 is a flowchart showing one example of a process flow 600 that may be executed by the testing system 102 of FIG. 1 to identify builds for further testing. For example, the process flow 600 may be executed by the test case subsystem 104 and/or another component of the testing system 102 to determine when a subject build has newly failed a test case.

At operation 602, the testing system 102 accesses test case data for a first build describing the application of one or more test cases to the first build. The first build may be, for example, the last build of a first testing period. At operation 604, the testing system 102 accesses test case data for a second build describing the application of the one or more test cases to the second build. The second build may be, for example, the last build of a second testing period after the first testing period. In some examples, the second build is the next build tested after the first build.

At operation 606, the testing system 102 determines if there is a newly failed test case. A newly failed test case may occur when the first build passed a test case followed by the second build failing the same test case. If there is one or more newly failed test cases, the testing system 102 may execute fault localization and bisection at operation 608, as described herein, to identify one or more error-inducing commit operations. If there are no newly failed test cases, the testing system 102 may move a next test at operation 610.

In view of the disclosure above, various examples are set forth below. It should be noted that one or more features of an example, taken in isolation or combination, should be considered within the disclosure of this application.

EXAMPLES

Example 1 is a system for testing software, the system comprising: a hardware processor programmed to perform operations comprising: accessing first time period commit data for a software application, the first time period commit data describing a plurality of commit operations executed on the software application; accessing test case data describing a first test case failed by a first build of the software application, the first build generated by a first commit operation of the plurality of commit operations; using the test case data to execute a fault localization operation, the fault localization operation to identify a first suspect program element of the first build; using the first suspect program element and the first time period commit data to select a second commit operation from the plurality of commit operations, the second commit operation being executed before the first commit operation; executing at least one test case on a second build of the software application, the second build generated by the second commit operation; using a result of executing the at least one test case on the second build to select a third commit operation of the plurality of commit operations; executing the at least one test case on a third build of the software application, the third build generated by the third commit operation; based at least in part on a result of executing the at least one test case on the third build, determining an error-inducing commit operation from the plurality of commit operations; and executing a corrective action based on the error-inducing commit operation.

In Example 2, the subject matter of Example 1 optionally includes the corrective action comprising sending a report message to a developer user, the report message comprising an indication of the error-inducing commit operation.

In Example 3, the subject matter of any one or more of Examples 1-2 optionally includes the corrective action comprising accessing a good build of the software application generated by a good commit operation prior to the error-inducing commit operation.

In Example 4, the subject matter of any one or more of Examples 1-3 optionally includes wherein the second build passes the at least one test case, and wherein the third commit operation is after the second commit operation.

In Example 5, the subject matter of any one or more of Examples 1-4 optionally includes wherein the second build fails the at least one test case, and wherein the third commit operation is before the second commit operation.

In Example 6, the subject matter of any one or more of Examples 1-5 optionally includes the test case data indicating that a prior build of the software application passed the first test case, the prior build having been generated at least in part by a second plurality of commit operations executed prior to the plurality of commit operations.

In Example 7, the subject matter of Example 6 optionally includes the operations further comprising using the test case data to determine that the first test case is newly failed by the first build.

In Example 8, the subject matter of any one or more of Examples 1-7 optionally includes the operations further comprising determining that the first suspect program element was modified by the second commit operation.

In Example 9, the subject matter of any one or more of Examples 1-8 optionally includes the executing of the fault localization operation comprising: applying a plurality of test cases to the first build of the software application; accessing coverage data describing program elements of the first build that are executed during the plurality of test cases; and identifying the first suspect program element using a result of the plurality of test cases and the coverage data.

Example 10 is a method of testing software, the method comprising: accessing first time period commit data for a software application, the first time period commit data describing a plurality of commit operations executed on the software application; accessing test case data describing a first test case failed by a first build of the software application, the first build generated by a first commit operation of the plurality of commit operations; using the test case data to execute a fault localization operation, the fault localization operation to identify a first suspect program element of the first build; using the first suspect program element and the first time period commit data to select a second commit operation from the plurality of commit operations, the second commit operation being executed before the first commit operation; executing at least one test case on a second build of the software application, the second build generated by the second commit operation; using a result of executing the at least one test case on the second build to select a third commit operation of the plurality of commit operations; executing the at least one test case on a third build of the software application, the third build generated by the third commit operation; based at least in part on a result of executing the at least one test case on the third build, determining an error-inducing commit operation from the plurality of commit operations; and executing a corrective action based on the error-inducing commit operation.

In Example 11, the subject matter of Example 10 optionally includes the corrective action comprising sending a report message to a developer user, the report message comprising an indication of the error-inducing commit operation.

In Example 12, the subject matter of any one or more of Examples 10-11 optionally includes the corrective action comprising accessing a good build of the software application generated by a good commit operation prior to the error-inducing commit operation.

In Example 13, the subject matter of any one or more of Examples 10-12 optionally includes wherein the second build passes the at least one test case, and wherein the third commit operation is after the second commit operation.

In Example 14, the subject matter of any one or more of Examples 10-13 optionally includes wherein the second build fails the at least one test case, and wherein the third commit operation is before the second commit operation.

In Example 15, the subject matter of any one or more of Examples 10-14 optionally includes the test case data indicating that a prior build of the software application passed the first test case, the prior build having been generated at least in part by a second plurality of commit operations executed prior to the plurality of commit operations.

In Example 16, the subject matter of Example 15 optionally includes using the test case data to determine that the first test case is newly failed by the first build.

In Example 17, the subject matter of any one or more of Examples 10-16 optionally includes determining that the first suspect program element was modified by the second commit operation.

In Example 18, the subject matter of any one or more of Examples 10-17 optionally includes the executing of the fault localization operation comprising: applying a plurality of test cases to the first build of the software application; accessing coverage data describing program elements of the first build that are executed during the plurality of test cases; and identifying the first suspect program element using a result of the plurality of test cases and the coverage data.

Example 19 is a non-transitory machine-readable medium comprising instructions thereon that, when executed by at least one processor, cause the at least one processor to perform operations comprising: accessing first time period commit data for a software application, the first time period commit data describing a plurality of commit operations executed on the software application; accessing test case data describing a first test case failed by a first build of the software application, the first build generated by a first commit operation of the plurality of commit operations; using the test case data to execute a fault localization operation, the fault localization operation to identify a first suspect program element of the first build; using the first suspect program element and the first time period commit data to select a second commit operation from the plurality of commit operations, the second commit operation being executed before the first commit operation; executing at least one test case on a second build of the software application, the second build generated by the second commit operation; using a result of executing the at least one test case on the second build to select a third commit operation of the plurality of commit operations; executing the at least one test case on a third build of the software application, the third build generated by the third commit operation; based at least in part on a result of executing the at least one test case on the third build, determining an error-inducing commit operation from the plurality of commit operations; and executing a corrective action based on the error-inducing commit operation.

In Example 20, the subject matter of Example 19 optionally includes the corrective action comprising sending a report message to a developer user, the report message comprising an indication of the error-inducing commit operation.

Figure 7:
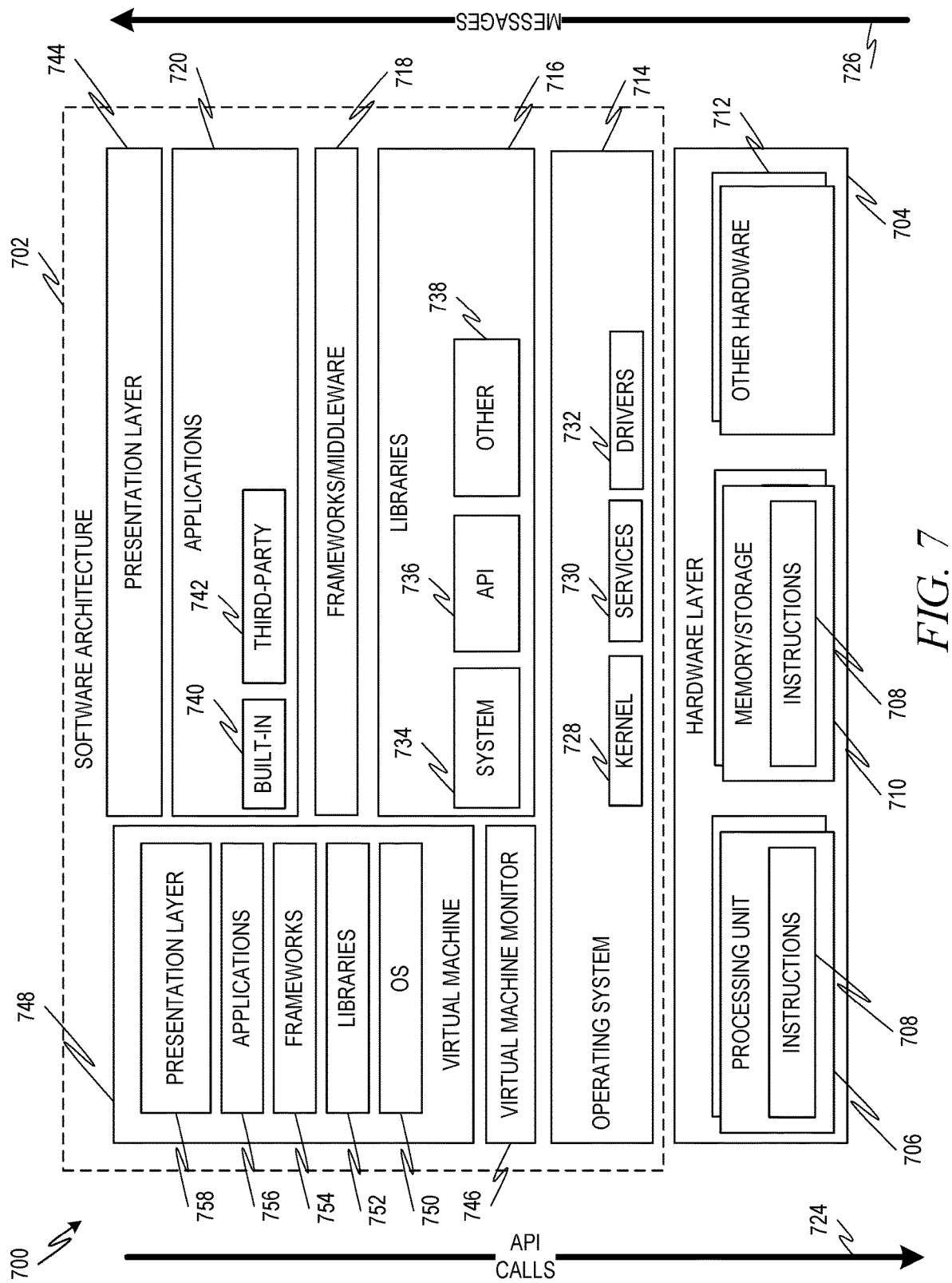
FIG. 7 is a block diagram showing one example of a software architecture for a computing device.

FIG. 7 is a block diagram 700 showing one example of a software architecture 702 for a computing device. The architecture 702 may be used in conjunction with various hardware architectures, for example, as described herein. FIG. 7 is merely a non-limiting example of a software architecture and many other architectures may be implemented to facilitate the functionality described herein. The software architecture 702 and various other components described in FIG. 7 may be used to implement various other systems described herein. For example, the software architecture 702 shows one example way for implementing a testing system 102 or other computing devices described herein.

In FIG. 7, A representative hardware layer 704 is illustrated and can represent, for example, any of the above referenced computing devices. In some examples, the hardware layer 704 may be implemented according to the architecture of the computer system of FIG. 7.

The representative hardware layer 704 comprises one or more processing units 706 having associated executable instructions 708. Executable instructions 708 represent the executable instructions of the software architecture 702, including implementation of the methods, modules, subsystems, and components, and so forth described herein and may also include memory and/or storage modules 710, which also have executable instructions 708. Hardware layer 704 may also comprise other hardware as indicated by other hardware 712 which represents any other hardware of the hardware layer 704, such as the other hardware illustrated as part of the architecture 702.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720, and presentation layer 744. Operationally, the applications 720 and/or other components within the layers may invoke API calls 724 through the software stack and access a response, returned values, and so forth illustrated as messages 726 in response to the API calls 724. The layers illustrated are representative in nature and not all software architectures have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of an interrupt and, in response, cause the architecture 702 to pause its current processing and execute an interrupt service routine (ISR) when an interrupt is accessed.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system 734 libraries (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 and/or other software components/modules. For example, the frameworks 718 may provide various graphic user interface (GUI) functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any of the built-in 740 applications as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third-party application 742 may invoke the API calls 724 provided by the mobile operating system such as operating system 714 to facilitate functionality described herein.

The applications 720 may utilize built-in operating system functions (e.g., kernel 728, services 730 and/or drivers 732), libraries (e.g., system 734, APIs 736, and other libraries 738), and frameworks/middleware 718 to create user interfaces to interact with users of the system. Alternatively, or additionally, in some systems interactions with a user may occur through a presentation layer, such as presentation layer 744. In these systems, the application/module "logic" can be separated from the aspects of the application/module that interact with a user.

Some software architectures utilize virtual machines. For example, the various environments described herein may implement one or more virtual machines executing to provide a software application or service. The example of FIG. 7 illustrates by virtual machine 748. A virtual machine creates a software environment where applications/modules can execute as if they were executing on a hardware computing device. A virtual machine 748 is hosted by a host operating system (operating system 714) and typically, although not always, has a virtual machine monitor 746, which manages the operation of the virtual machine 748 as well as the interface with the host operating system (i.e., operating system 714). A software architecture executes within the virtual machine 748 such as an operating system 750, libraries 752, frameworks/middleware 754, applications 756 and/or presentation layer 758. These layers of software architecture executing within the virtual machine 748 can be the same as corresponding layers previously described or may be different.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

Computer software, including code for implementing software services can be written in any form of programming language, including compiled or interpreted languages, and it can be deployed in any form, including as a standalone program or as a module, subroutine, or other unit suitable for use in a computing environment. Computer software can be deployed to be executed on one computer or on multiple computers at one site or distributed across multiple sites and interconnected by a communication network.

In example embodiments, operations may be performed by one or more programmable processors executing a computer program to perform functions by operating on input data and generating output.

Figure 8:
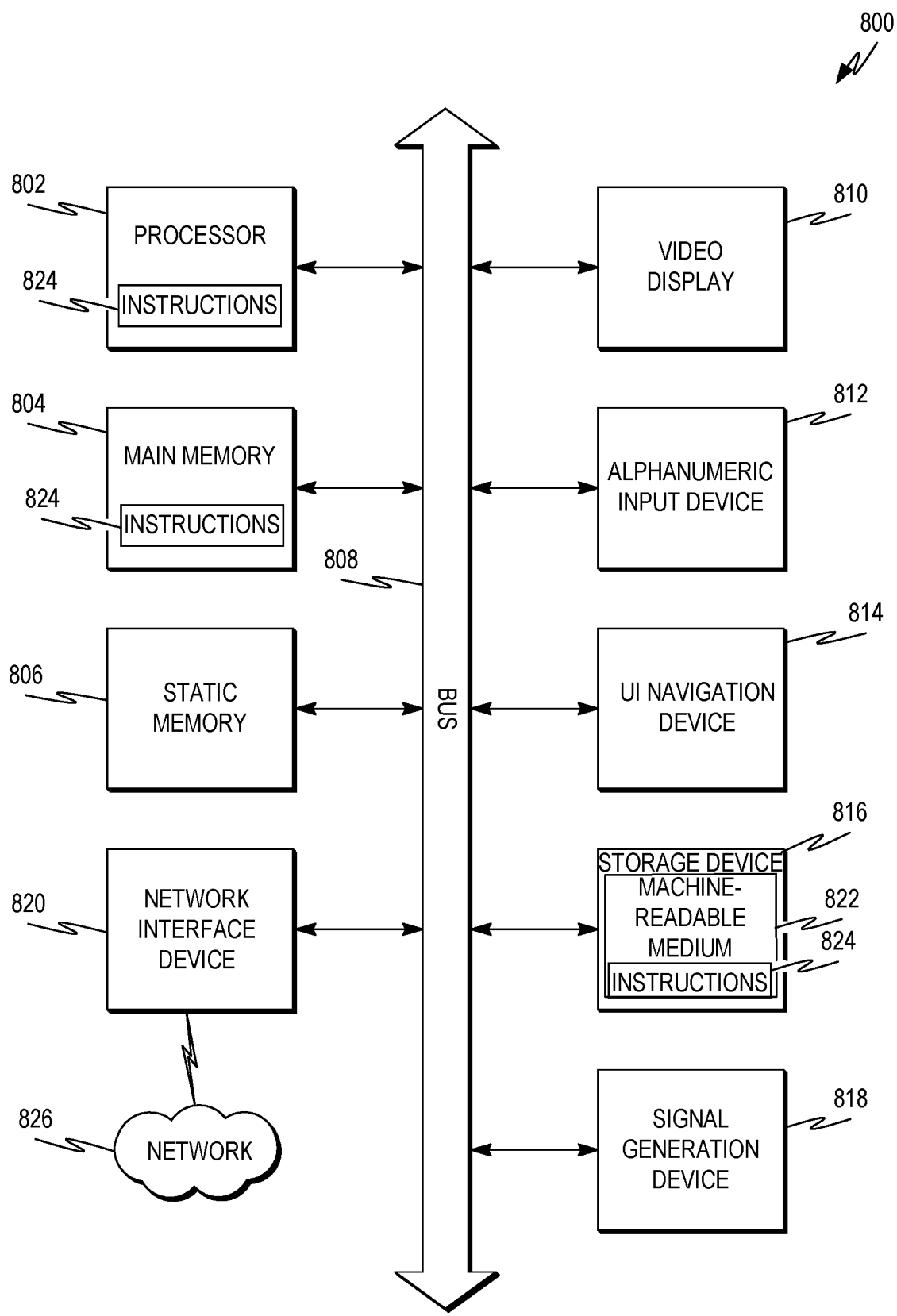
FIG. 8 is a block diagram of a machine in the example form of a computer system within which instructions may be executed for causing the machine to perform any one or more of the methodologies discussed herein.

FIG. 8 is a block diagram of a machine in the example form of a computer system 800 within which instructions 824 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation (or cursor control) device 814 (e.g., a mouse), a disk drive unit 816, a signal generation device 818 (e.g., a speaker), and a network interface device 820.

The disk drive unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media 822.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 824 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for testing software, the system comprising:
    a hardware processor programmed to perform operations comprising:
        accessing test case data describing a first test case failed by a first build of a software application, the first build generated by a first commit operation of a plurality of commit operations executed on the software application;
        using the test case data to execute a fault localization operation, the fault localization operation to identify a first suspect program element of the first build;
        using the first suspect program element to select a second commit operation of the plurality of commit operations, the second commit operation being executed before the first commit operation;
        executing at least one test case on a second build of the software application, the second build generated by the second commit operation;
        based at least in part on a result of executing the at least one test case on the second build, determining an error-inducing commit operation from the plurality of commit operations; and
        executing a corrective action based on the error-inducing commit operation.

2. The system of claim 1, the operations further comprising:
    using a result of executing the at least one test case on the second build to select a third commit operation of the plurality of commit operations; and
    executing the at least one test case on a third build of the software application, the third build generated by the third commit operation, the determining of the error-inducing commit operation also being based at least in part on a result of executing the at least one test case on the third build.

3. The system of claim 2, wherein the second build passes the at least one test case, and wherein the third commit operation is after the second commit operation.

4. The system of claim 2, wherein the second build fails the at least one test case, and wherein the third commit operation is before the second commit operation.

5. The system of claim 1, the corrective action comprising sending a report message to a developer user, the report message comprising an indication of the error-inducing commit operation.

6. The system of claim 1, the corrective action comprising accessing a good build of the software application generated by a good commit operation prior to the error-inducing commit operation.

7. The system of claim 1, the test case data indicating that a prior build of the software application passed the first test case, the prior build having been generated at least in part by a second plurality of commit operations executed prior to the plurality of commit operations.

8. The system of claim 1, the operations further comprising using the test case data to determine that the first test case is newly failed by the first build.

9. The system of claim 1, the operations further comprising determining that the first suspect program element was modified by the second commit operation.

10. The system of claim 1, the executing of the fault localization operation comprising:
    applying a plurality of test cases to the first build of the software application;
    accessing coverage data describing program elements of the first build that are executed during the plurality of test cases; and
    identifying the first suspect program element using a result of the plurality of test cases and the coverage data.

11. A method for testing software, the method comprising:
accessing, by at least one processor, test case data describing a first test case failed by a first build of a software application, the first build generated by a first commit operation of a plurality of commit operations executed on the software application;
using, by the at least one processor, the test case data to execute a fault localization operation, the fault localization operation to identify a first suspect program element of the first build;
using, by the at least one processor, the first suspect program element to select a second commit operation of the plurality of commit operations, the second commit operation being executed before the first commit operation;
executing, by the at least one processor, at least one test case on a second build of the software application, the second build generated by the second commit operation;
based at least in part on a result of executing the at least one test case on the second build, determining, by the at least one processor, an error-inducing commit operation from the plurality of commit operations; and
executing, by the at least one processor, a corrective action based on the error-inducing commit operation.

12. The method of claim 11, further comprising:
using, by the at least one processor, a result of executing the at least one test case on the second build to select a third commit operation of the plurality of commit operations; and
executing, by the at least one processor, the at least one test case on a third build of the software application, the third build generated by the third commit operation, the determining of the error-inducing commit operation also being based at least in part on a result of executing the at least one test case on the third build.

13. The method of claim 11, the corrective action comprising sending a report message to a developer user, the report message comprising an indication of the error-inducing commit operation.

14. The method of claim 11, the corrective action comprising accessing a good build of the software application generated by a good commit operation prior to the error-inducing commit operation.

15. The method of claim 11, the test case data indicating that a prior build of the software application passed the first test case, the prior build having been generated at least in part by a second plurality of commit operations executed prior to the plurality of commit operations.

16. The method of claim 11, further comprising using, by the at least one processor, the test case data to determine that the first test case is newly failed by the first build.

17. The method of claim 11, further comprising determining, by the at least one processor, that the first suspect program element was modified by the second commit operation.

18. The method of claim 11, the executing of the fault localization operation comprising:
applying, by the at least one processor, a plurality of test cases to the first build of the software application;
accessing, by the at least one processor, coverage data describing program elements of the first build that are executed during the plurality of test cases; and
identifying, by the at least one processor, the first suspect program element using a result of the plurality of test cases and the coverage data.

19. A non-transitory machine-readable medium comprising instructions thereon that, when executed by at least one processor, cause the at least one processor to perform operations comprising:
accessing test case data describing a first test case failed by a first build of a software application, the first build generated by a first commit operation of a plurality of commit operations executed on the software application;
using the test case data to execute a fault localization operation, the fault localization operation to identify a first suspect program element of the first build;
using the first suspect program element to select a second commit operation of the plurality of commit operations, the second commit operation being executed before the first commit operation;
executing at least one test case on a second build of the software application, the second build generated by the second commit operation;
based at least in part on a result of executing the at least one test case on the second build, determining an error-inducing commit operation from the plurality of commit operations; and
executing a corrective action based on the error-inducing commit operation.

20. The non-transitory machine-readable medium of claim 19, the operations further comprising:
using a result of executing the at least one test case on the second build to select a third commit operation of the plurality of commit operations; and
executing the at least one test case on a third build of the software application, the third build generated by the third commit operation, the determining of the error-inducing commit operation also being based at least in part on a result of executing the at least one test case on the third build.

* * * * *